United States Patent Office 2,922,767
Patented Jan. 26, 1960

2,922,767

CATALYST AND PREPARATION THEREOF

John H. Koch, Jr., Nutley, N.J., assignor to Engelhard Industries, Inc., a corporation of New Jersey No Drawing. Application March 12, 1957
Serial No. 645,401

12 Claims. (Cl. 252—466)

The present invention relates to the catalyst field and, more particularly, to an improved alumina base for carrying catalytically active promoting metal components and resulting catalysts and includes the preparation of rehydrated gamma alumina and the preparation of platinum impregnated catalysts thereon.

The common method of preparing petroleum reforming catalysts by impregnating alumina gel with a platinum (Pt) compound has the disadvantage that the alumina used is not a material of constant properties, but consists of amorphous alumina of changing structure on standing, and crystalline boehmite and trihydrates which may change from one to the other as aging proceeds. Since surface area, pore size distribution and pellet strength of the completed catalyst are affected by the structure of the alumina gel precursor at the time of drying, with a major effect on reforming characteristics, it is important to maintain close control of the alumina gel structure. This control of structure can involve an important part of the overall manufacturing expense.

It would be advantageous if suitable catalysts could be made by drying the hydrous alumina before impregnation with the platinum. Up until the discoveries leading to my invention, however, this approach for the most part had proven unsatisfactory. For example, alumina which had been dried without calcination to remove hydrates prior to impregnation was found to produce catalysts which are considerably less active than gel-impregnated catalysts. Also, alumina which had been dried and calcined to remove hydrates and produce gamma alumina (the term "gamma alumina" is used herein as a general term for the transitional phases resulting from the dehydration of alumina trihydrate and boehmite at temperatures too low to produce alpha alumina) at the time of impregnation was found to produce catalysts which are usually slightly inferior to gel impregnations. In my research investigations in this field looking for a process of preparing a catalyst which would be fully equal to gel-impregnated catalysts, I discovered that this could be accomplished by impregnating (or depositing) platinum or the like on hydrous alumina which had been calcined to gamma alumina and then substantially, but not completely, rehydrated. Gamma alumina is the activated or gamma alumina modifications resulting from low temperature calcination as distinguished from alpha alumina resulting from high temperature calcination around 1800° F. and above.

In general, my process can be carried out by preparing hydrous alumina by conventional means e.g. by the reaction of aluminum chloride with ammonia water. The resulting product, hydrous aluminum oxide, which when aged or dried ordinarily contains a mixture of boehmite and trihydrate with or without some amorphous alumina, is calcined to convert at least about 70 percent up to 100 percent of the hydrous alumina to gamma alumina. The calcining temperatures may run from about 400 to 1500° F., with a range of about 500 to 1000° F. and with a conversion of about 90 to 100 percent of the hydrous alumina to gamma alumina being preferred. Catalysts made with rotary-calcined powder at the higher temperatures e.g. about 1000° F. are generally weaker in crushing strength than those made with powder rotary-calcined at the lower temperatures. The calcined gamma alumina which may contain some hydrous alumina (usually boehmite) is then rehydrated with water until at least about 10 percent up to about 75 percent of the gamma alumina is hydrated. Rehydration of about 25–65 percent of gamma alumina, yielding a hydrated product containing both boehmite and trihydrate, the latter generally being present chiefly as bayerite, is usually preferred. Rehydration can be carried out, however, to give only boehmite (see Example 3). Also, as illustrated in Example 5 where high calcining temperatures (1400° F.) are employed the rehydrated product may only contain trihydrate. Complete or substantially complete rehydration of the gamma alumina should be avoided as the impregnation of this base material yields inferior catalysts as pointed out in detail below. The partially rehydrated gamma alumina and which still contains about 20 to 90 percent and preferably about 30 to 85 percent gamma alumina, can be impregnated with platinum, other platinum group noble metals, or other catalytically active promoting metal components e.g. chromium, cobalt-molybdenum, etc., and extruded and pelleted in accordance with standard practices in the art of preparing alumina base metallic catalysts such as illustrated by Haensel Patent No. 2,479,109.

The rehydration product is affected somewhat by the severity of the previous calcination. For example, one portion of dried alumina gel containing about 8 percent boehmite and 86 percent trihydrate was calcined at 700° F. to 100 percent gamma alumina and another portion calcined at 1500° F. to 100 percent gamma alumina. Upon rehydration for seven days at 78° C., the portion calcined at 700° F. contained about 29 percent boehmite and 68 percent trihydrate and the portion calcined at 1500° F. contained about 3 percent boehmite, 27 percent trihydrate and 70 percent still gamma alumina. In general rehydration of gamma alumina formed at the lower temperatures produces considerable amounts of both boehmite and trihydrate and rehydration of gamma alumina formed at the higher temperatures produces chiefly trihydrate. Rehydration is also affected by the amount of water available, small amounts of water, e.g. 0.4 kg. water/kg. $Al_2O_3$, favoring the formation of boehmite ($Al_2O_3 \cdot H_2O$) with its one mol of water of hydration, whereas relatively large amounts of water, e.g. 1.8 kg. or more water/kg. $Al_2O_3$, favoring the formation of trihydrate ($Al_2O_3 \cdot 3H_2O$) with its three mols of water of hydration. Exposure of the gamma or activated alumina to excess water (1.8 or more kgs./kg. $Al_2O_3$) causes conversion to hydrates, normally a mixture of boehmite and trihydrate, at rates which increase as the temperature is raised from about 25 to 80° C. At higher temperatures, e.g. 110° C., the product is chiefly boehmite. Optimum conditions for obtaining partial rehydration of a particular gamma alumina product can readily be ascertained by preliminary test. It is remarkable, regardless of the precursor crystal structure, e.g. whether it be boehmite, bayerite, bayerite-II (randomite), gibbsite (alpha trihydrate or hydrargillite) or a mixture of the same, that the passage of the hydrous alumina through the gamma phase, followed by rehydration to a product containing trihydrate, results in a trihydrate product containing more (usually 80 percent) bayerite than bayerite-II and gibbsite.

Impregnation of the rehydrated gamma alumina can be carried out either by blending a dry powder of the rehydrated product with an aqueous solution or sol of a platinum compound or by mixing the solution or sol of the platinum compound with a wet (aqueous) slurry of the rehydrated product. If the rehydrated alumina is dried and ground and then reslurried for impregnation or incorporation of the catalytically active metal on the base, secondary agglomerates may persist, as evidenced by rapid settling or microscope examination. This can be avoided if the rehydrated alumina is wet ground, as many of the primary particles remain discrete, a typical particle size for a 100 mesh grind, for example, may be as low as 2 microns. Also, it is possible with wet ground slurries to suspend the rehydrated alumina with much less water than is required in the case of alumina gel; 30 percent $Al_2O_3$ suspensions, for example, are feasible with ordinary stirring. After impregnation of the rehydrated gamma alumina, drying of the powder and reduction of the platinum, a comparison shows the wet ground, slurry impregnated material to appear completely homogeneous, whereas the dry-impregnated powders appear somewhat heterogeneous. However, upon extrusion the observable heterogeneous character of the latter material disappears and both types of catalyst give favorable data in reforming tests.

The following examples will serve to illustrate the invention.

EXAMPLE 1

Alumina (prepared by precipitating aluminum chloride as hydrous aluminum oxide with ammonia water and washing to low chloride content) was aged as a slurry to about 20 percent boehmite and 80 percent trihydrate (based on $Al_2O_3$ content) and drum-dried. The powder was tray-calcined at about 300° C. to around 20 percent boehmite, 0 to 10 percent trihydrate and 70 to 80 percent gamma alumina.

The calcined product was moistened with about 0.5 kg. water per kg. $Al_2O_3$ and allowed to stand at room temperature for about a month. At the end of this time it had rehydrated to 30 percent boehmite and 26 percent trihydrate. It was then wet ground as a 15 percent $Al_2O_3$ slurry to pass a 100 mesh sieve, producing an unagglomerated suspension of particles less than 8 microns in size. About 7 kgs. of this slurry containing 1.14 kg. of $Al_2O_3$ were impregnated by addition over 15 minutes of 68 cc. of $H_2PtCl_6$ solution containing 10 percent Pt, producing a 0.6 percent Pt impregnation, in the final product. The slurry was then drum-dried, extruded to form $\frac{1}{16}''$ pellets which were calcined with dried flowing air, reaching 480° C. in about four hours and holding this temperature two hours. The pellets were finally cooled without exposure to moisture.

Tests of the resultant catalyst (Pk 618) under reforming conditions showed it to be a reforming catalyst of high initial activity, giving a high octane product in excellent yields, and having a long life and capacity for oxidative regeneration.

EXAMPLE 2

Alumina precipitated and washed as in Example 1 was aged as a slurry to about 6 percent amorphous, 8 percent boehmite, and 86 percent trihydrate, as measured by X-ray diffraction. It was drum-dried and rotary-calcined at about 700° F. with about five minutes hold-up time in the calciner, producing 100 percent gamma alumina containing 84 percent $Al_2O_3$. The gamma alumina (except for catalyst Pk 624) was wet for rehydration by adding 1.8 kg. of water per kg. $Al_2O_3$ (plus additional water to replace loss by evaporation). Rehydration was carried out as indicated in the table below for preparation of 0.6 percent Pt catalysts as in Example 1.

Table

| Catalyst No. | Treatment for Rehydration | Alumina Percent When Pt Added | | |
|---|---|---|---|---|
| | | Boehmite | Trihydrate | Gamma |
| Pk 624 | Dried at 110° C. | Very low | 0 | Ca. about 100 |
| Pk 710 | Kept wet 2 days at 50° C. | 7 | 8 | 85. |
| Pk 713 | Kept wet 1 day at 75° C. | 9 | 2 | 89. |
| Pk 689 | Kept wet 3 days at 75° C. | 23 | 33 | 44. |
| Pk 690 | ----do---- | 23 | 33 | 44. |
| Pk 691 | Kept wet 14 days at 50° C., then 5 days at 75° C. | 23 | 49 | 28. |
| Pk 701 | Kept wet 7 days at 75° C. | 20 | 68 | |
| Pk 703 | Kept wet 7 days at 75° C., then 3 days at 110° C. | 37 | about 63 | Very low. |

It will be noted in this table that similar rehydration takes place at 50° C. and 75° C., except that it occurs more rapidly at the higher temperature. Also, that rehydration at 110° C. (in a closed container) causes some conversion of trihydrate to boehmite.

Each of the aluminas prepared as described above were dried and ground to pass a 20 mesh sieve. With the exception of the alumina for catalyst Pk 689, each alumina was impregnated by hand mixing of the powder with $H_2PtCl_6$ solution added slowly. In the case of catalyst Pk 689, the alumina was suspended by stirring with water and then impregnated first with $H_2PtCl_6$ and then with $H_2S$, followed by filtering and drying. Each of the catalysts was extruded and calcined essentially in the same manner as described for Example 1.

The calcined catalysts were subjected to an accelerated aging test in comparison with a superior type of catalyst used commercially, designated as the Standard. Conditions were 15 WHSV, 200 pounds' pressure, 10/1 recycle ratio, and a 48-hour test period. The catalyst was tested in a bed of specified dilution. In terms of Research Octane Number (clear) data were obtained for Relative Initial Activity (R.A.), and Relative Life (R.L.) or relative barrels of product per pound of catalyst. The test results follow:

| Catalyst No. | R.A. | R.L. | $\frac{R.A. \times R.L.}{100}$ |
|---|---|---|---|
| Standard | 100 | 100 | 100 |
| Pk 624 | 83 | 63 | 52 |
| Pk 710 | 114 | 93 | 106 |
| Pk 713 | 103 | 91 | 94 |
| Pk 689 | 112 | 77 | 86 |
| Pk 690 | 126 | 77 | 97 |
| Pk 691 | 111 | 91 | 100 |
| Pk 701 | 78 | 94 | 73 |
| Pk 703 | 77 | 87 | 67 |

The severity of the reforming reaction under these conditions is believed affected by slight differences of temperature which are difficult to control. In consequence, the third specification, $$\frac{\text{''}R.A. \times R.L.\text{''}}{100}$$

is believed to give the best comparison with the standard.

In accordance with this test, Pk 710, Pk 713, Pk 690, and Pk 691 are seen to be approximately equal to the standard, with Pk 689 slightly poorer and Pk 624, Pk 701, and Pk 703 considerably poorer. Pk 710, Pk 713, Pk 690, and Pk 689 were prepared from gamma alumina rehydrated to from about 10 to 75 percent total hydrates, with impregnation by blending of powder with $H_2PtCl_6$ solution. Pk 689 differs from Pk 690 only by using a different method of impregnation. As for the catalysts which were found considerably poorer, Pk 624 is an impregnation of gamma alumina essentially without hydrates, and Pk 701 and Pk 703 are impregnations of gamma alumina rehydrated to such an extent that little or no gamma alumina remains.

Several of the catlysts were given longer evaluation tests at lower space velocities than the Accelerated Aging Test just described. 3 WHSV reforming runs at about 938° F., 10:1 recycle, and 200 lbs. with specified diluted bed conditions, were made for about 240 hours on catalysts Pk 624 and Pk 689 in comparison with the standard catalyst. Activity and life comparisons showed Pk 624 poorer and Pk 689 approximately equal to the standard.

Another test developed to evaluate reforming catalysts has also been run with a diluted bed, 10:1 recycle, and 200 lbs. pressure. This has been called the "Dropping Space Velocity" test as it is a high severity test designed to maintain the Standard Catalyst at a constant octane level by dropping the space velocity. It has been found empirically that the Standard Catalyst approximately maintains such a constant octane level at a temperature of 933° F., when the WHSV is dropped at the rate of 10 percent per 24 hours through the sequence 3.0, 2.7, 2.4, 2.1, and 1.8. After 114 hours' run, the WHSV is returned to 3 for 24 hours in order to establish the activity decline of the catalyst during this period. The temperature is then raised to 953° F., which was found to increase the activity of the Standard Catalyst to about its original level. Runs were then continued at 3 WHSV and 953° F. to determine how rapidly activity declined under these more severe operating conditions.

The Dropping Space Velocity test just described was carried out on catalysts Pk 624, Pk 710, Pk 713, Pk 691, and Pk 701 of the group considered in this example. Results on this test indicated the Pk 710, Pk 713, and Pk 691 catalysts were approximately equal to the Standard Catalyst in octane, density, aniline point, percent aromatics, and liquid yield, and in gas make, mol percent hydrogen, and hydrocarbon gas distribution. Catalysts Pk 624 and Pk 701, on the other hand, were generally inferior in these specifications.

The catalysts of Example 2 were used for the reforming of Mid-Continent straight run naphthas with initial boiling points approximately 230° F., end points approximately 370° F., and A.S.T.M. research method octane numbers approximately 39.

EXAMPLE 3

Alumina precipitated and washed as in Example 1 was aged as a slurry to about 19 percent boehmite and 81 percent trihydrate, then drum-dried and rotary-calcined at a top temperature of 700° F. to about 6 percent boehmite, 94 percent gamma, and 89.0 percent $Al_2O_3$. To 1.77 kg. of this alumina, 500 cc. of distilled water was added evenly, then the moistened alumina was heated overnight in a closed jar at 75° C. The resultant alumina containing 16 percent boehmite, 0 percent trihydrate, and 84 percent gamma was impregnated without grinding with $H_2PtCl_6$ for a 0.6 percent Pt catalyst, extruded, and calcined similarly to the catalysts described in Example 2.

This catalyst was tested by the 15 WHSV and the Dropping Space Velocity tests previously described, with the result that it was found slightly inferior to the Standard according to the former test, and equal to it in the latter test.

EXAMPLE 4

A portion of the alumina used for Example 3 was carried through rotary calcination in the same way. It was then rehydrated in contact with water at 75° C. to 13 percent boehmite, 33 percent trihydrate, and 54 percent gamma. A portion used for catalyst Pk 749 was coated by hand mixing with $H_2PtCl_6$ to give a 0.6 percent Pt catalyst, and then mixed with additional alumina to reduce the Pt content to 0.35 percent. A further portion used for catalyst Pk 750 was blended directly with $H_2PtCl_6$ to give a 0.35 percent Pt catalyst. Both catalysts were then extruded and calcined as previously described.

The catalysts were evaluated by the Dropping Space Velocity test in comparison with the 0.6 percent Pt Standard. Data for the two runs were nearly identical. They differ from the 0.6 percent Pt Standard in being slightly higher in octane, and slightly lower in liquid yield and mol percent hydrogen. The fact that both 0.35 percent Pt catalysts were found about equal is interesting evidence that complete homogeneity at the time of impregnation may not be essential to produce superior catalyst properties. In the process of extrusion, any Pt inhomogeneity previously present disappears, as far as visual examination is concerned.

EXAMPLE 5

A portion of the alumina used for the drum-drying in Example 2 was rotary-calcined at a top temperature of 1400° F. to 100 percent gamma alumina and 97.0 percent $Al_2O_3$. It was then rehydrated at 78° C. to 0 percent boehmite, 21 percent trihydrate, and 79 percent gamma. $H_2PtCl_6$ was added by hand blending for a 0.6 percent Pt catalyst. The powder was extruded, dried, and calcined essentially in the same manner as described for Examples 1 and 2.

This catalyst was given the 15 WHSV accelerated aging test previously described, with the result of Relative Activity of 94, Relative Life of 89, and R.A.×R.L./100 of 84. These values are slightly lower than those for the Standard, and, as pointed out above, catalysts made with high temperature rotary-calcined powder are generally weaker in crushing strength than those made from powder calcined at lower temperatures.

EXAMPLE 6

Alumina precipitated and washed as in Example 1 was immediately drum-dried after the washing, resulting in a powder composition of 16 percent amorphous, 66 percent boehmite, and 18 percent trihydrate. The powder was rotary-calcined at a top temperature of 850° F. to 6 percent boehmite and 94 percent gamma. It was then rehydrated at 75° C. to 10 percent boehmite, 23 percent trihydrate, and 67 percent gamma. $H_2PtCl_6$ was added by hand blending for a 0.6 percent Pt catalyst, followed by extrusion and calcination, the same as previously described. Test of catalyst reforming properties was made by the Dropping Space Velocity Test, indicating characteristics essentially equal to the Standard Catalyst.

EXAMPLE 7

Small pieces of pure aluminum were reacted with dry isopropanol and mercuric chloride to produce aluminum isopropoxide. The volatile product was distilled and a middle fraction of the aluminum isopropoxide taken. A melt of the aluminum isopropoxide at 100° C. was injected through a capillary tube into water at 8° C., then the slurry was homogenized in a colloid mill. 0.01 percent $NH_3$ ($Al_2O_3$ basis) was added, followed by filtering and washing. The filter-cake was aged wet at 45° C. for five days, and then dried; the product contained about 14 percent boehmite and 85 percent trihydrate.

This alumina was rotary calcined at a top temperature of about 900° F. to about 10 percent boehmite and 90 percent gamma. It was then rehydrated at 75° C. to 13 percent boehmite, 54 percent trihydrate, and 33 percent gamma alumina. The powder was dried, ground fine, and blended slowly with $H_2PtCl_6$ solution, followed by extrusion and calcination in a manner similar to previous examples. This catalyst (Pk 785) was tested by the 15 WHSV Reforming Test previously described, with the following result: R.A. 90; R.L. 106;

$$\frac{R.A. \times R.L.}{100} \ 95$$

A middle fraction of aluminum isopropoxide, as described above, was added to three times its weight of a solution of formic acid and water, containing an amount of formic acid equal to 20% by weight of the aluminum oxide content of the hydrolysate. The product, at a pH of about 5.4, contained no boehmite or trihydrate, as determined by X-ray diffraction. This material was dried, calcined at 500° C. to gamma alumina with loss of part of the acid, then covered with water and rehydrated to 7% boehmite, 18% bayerite, 16% bayerite-II and 5% gibbsite, the product thus containing less than 50% of the trihydrate in the form of bayerite. The product is converted into a platinum-carrying catalyst in accordance with the procedure of this Example 7.

EXAMPLE 8

Drying of the hydrous alumina before impregnation in accordance with the present invention gives increased flexibility of manufacture with steady operation, less overtime work, smaller platinum inventory and makes it readily possible to carry out the impregnation or coating operation in different plants or countries resulting in savings in terms of tariffs, dollar exchange, etc. Drum-drying of the hydrous alumina before impregnation also aids in avoiding loss of platinum in the drum-drying dust as well as reducing expensive drum maintenance such as encountered in the drum-drying of corrosive alumina gel impregnating acidic platinum slurries.

In the reforming of gasoline boiling range hydrocarbons my catalyst containing about 0.2 to 1.5 percent or more platinum can be employed under the usual processing conditions, for instance 800 to 1000° F., 100 to 750 p.s.i., 1 to 10 WHSV, and 2 to 20 moles of hydrogen per mole of hydrocarbon. The hydrogen can be supplied to the reaction zone by recycling hydrogen-rich tail gases. The catalyst can be employed as a fixed or moving bed or in a fluidized system. Most often the system is comprised of a plurality of adiabatic reactors with a fixed catalyst bed in each reactor and a feed heater before each reactor. The liquid product can be separated from the reaction effluent as in an atmospheric pressure flash drum. Preferably, the conditions of reforming are selected to provide a liquid product of at least about 90 or 95 research octane number (neat).

When the processing cycle has continued for a time so that the liquid product of desired octane number can no longer be made at feasible temperatures and economically sound yields, the catalyst can be regenerated through removal of a substantial portion of the carbonaceous material deposited during processing. In general, this result can be accomplished through contact with an oxygen-containing gas at temperatures in the range from about 800 to 1000° F. After regeneration and reduction by contact with free hydrogen the catalyst is again employed for processing in the reforming operation. This processing regenerating cycle can be repeated until the catalyst when regenerated will no longer meet the requirements of a given situation as to octane-yield relationships of the liquid product.

I claim:

1. In the process of preparing a catalytically active metal-alumina catalyst by impregnation of gamma alumina with the catalytically active metal, the improvement which comprises contacting the gamma alumina with water to rehydrate at least about 10% up to about 75% of the gamma alumina, impregnating the resulting alumina base with the catalytically active metal, and calcining the metal impregnated alumina base to provide a catalytically active metal-alumina catalyst.

2. The process of preparing a catalytically active metal-alumina catalyst by incorporation of the catalytically-active metal on gamma alumina, which comprises calcining hydrous alumina to convert at least 70% of the hydrous alumina to gamma alumina, contacting the gamma alumina with water to rehydrate at least about 10% up to about 75% of the gamma alumina, incorporating the catalytically-active metal on the resulting alumina base, and calcining the metal-containing alumina base to provide a catalytically-active metal-alumina catalyst.

3. The process of preparing a platinum-alumina catalyst which comprises calcining hydrous alumina to convert at least 70% of the hydrous alumina to gamma alumina, contacting the gamma alumina with water to rehydrate at least 10% of the gamma alumina and yield mixture of hydrated alumina containing at least about 20% gamma alumina, impregnating the resulting alumina base with platinum and calcining the resulting platinum impregnated alumina base to provide a catalytically active platinum-alumina catalyst.

4. The catalyst produced by the process of claim 3.

5. In the process of preparing a platinum-alumina catalyst by the impregnation of gamma alumina with platinum, the improvement which comprises contacting the gamma alumina with water to rehydrate at least about 10% up to about 75% of the gamma alumina, impregnating the resulting hydrous alumina-gamma alumina mixture with the platinum and calcining the resulting platinum impregnated alumina base to provide a catalytically active platinum-alumina catalyst.

6. The catalyst prepared by the process of claim 5.

7. In the process of preparing a platinum-alumina catalyst by the impregnation of gamma alumina with platinum, the improvement which comprises contacting the gamma alumina with water to rehydrate and convert about 10 to about 75% of the gamma alumina to hydrous alumina, wet grinding the resulting wet mixture, incorporating the platinum on the resulting wet ground alumina base and calcining the resulting platinum impregnated alumina base to provide a catalytically active platinum-alumina catalyst.

8. The method of preparing a platinum-alumina catalyst which comprises calcining hydrous alumina consisting essentially of a mixture of boehmite and trihydrate to convert about 90–100% of the hydrous alumina to gamma alumina, then contacting the calcined alumina with water to rehydrate about 10–75% of the gamma alumina, wet grinding the resulting rehydrated product, impregnating the same with platinum by mixing an aqueous solution of a platinum compound with an aqueous slurry of the wet ground rehydrated product and calcining the resulting platinum impregnated alumina base to provide a catalytically active platinum-alumina catalyst.

9. The catalyst produced by the method of claim 8.

10. The method of preparing a platinum-alumina catalyst which comprises calcining hydrous alumina at a temperature of about 400–1500° F. to convert at least about 70% of the hydrous alumina to gamma alumina, contacting the gamma alumina with water to rehydrate at least about 10 up to about 75% of the gamma alumina, impregrating the resulting alumina base with platinum and calcining the resulting platinum impregnated alumina base to provide a catalytically active platinum-alumina catalyst.

11. The method of preparing a platinum-alumina catalyst which comprises calcining hydrous alumina consisting essentially of a mixture of boehmite and trihydrate at a temperature of about 500–1000° F. to convert at least about 90% of the hydrous alumina to gamma alumina, contacting the calcined product with water to rehydrate and convert at least about 10% up to about 75% of the gamma alumina to hydrous alumina consisting essentially of boehmite and trihydrate, wet grinding the resulting wet rehydrated mixture slurrying the wet ground mixture in water, mixing the resulting slurry with an aqueous solution of $H_2PtCl_6$, and drying and calcining the resulting platinum impregnated alumina base to provide a catalytically active platinum-alumina catalyst.

12. The catalyst produced by the method of claim 11.

References Cited in the file of this patent

UNITED STATES PATENTS

| | | |
|---|---|---|
| 2,378,155 | Newsome et al. | June 12, 1945 |
| 2,415,061 | De Simo et al. | Jan. 28, 1947 |
| 2,499,675 | Owen | Mar. 7, 1950 |

OTHER REFERENCES

"Compte Rendu" vol. 233 of 1951, pp. 1284–5.

"Alumina Properties—Technical Paper No. 10," pub. by Aluminum Co. of America in 1953 (35 pages).